United States Patent
Chen et al.

(10) Patent No.: US 9,269,069 B2
(45) Date of Patent: Feb. 23, 2016

(54) APPARATUS AND METHOD FOR DISPLAYING SELECTABLE ICONS IN A TOOLBAR FOR A USER INTERFACE

(75) Inventors: Mingte Chen, Fremont, CA (US); Anil Kumar Annadata, Milpitas, CA (US); Kuang-Yang Huang, Fremont, CA (US); Rohit Bedi, Hayward, CA (US); Henry Dana Jay, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 848 days.

(21) Appl. No.: 13/341,344

(22) Filed: Dec. 30, 2011

(65) Prior Publication Data

US 2012/0260216 A1    Oct. 11, 2012

Related U.S. Application Data

(63) Continuation of application No. 10/001,140, filed on Nov. 15, 2001, now Pat. No. 8,091,042.

(51) Int. Cl.
*G06F 3/0481* (2013.01)
*G06Q 10/10* (2012.01)
(Continued)

(52) U.S. Cl.
CPC .............. *G06Q 10/10* (2013.01); *G06F 3/0481* (2013.01); *G06F 3/0482* (2013.01); *G06F 3/04817* (2013.01); *G06F 9/4443* (2013.01);
(Continued)

(58) Field of Classification Search
CPC ............. G06F 3/048–3/04897; H04M 3/5183; H04M 3/5191
USPC ......... 715/779, 788, 810, 815, 817–820, 828, 715/835, 840
See application file for complete search history.

(56) References Cited

U.S. PATENT DOCUMENTS

| 5,287,102 A | 2/1994 | McKiel, Jr. ............... 340/825.19 |
| 5,309,563 A | 5/1994 | Farrand et al. ................. 395/200 |

(Continued)

FOREIGN PATENT DOCUMENTS

| EP | 1113656 A2 | 7/2001 |
| JP | 9114759 | 5/1997 |

(Continued)

OTHER PUBLICATIONS

International Search Report as mailed from the PCT on Feb. 28, 2003 for co-related WO Application (PCT/US02/31152; Filed Sep. 30, 2002), 5 pages.

(Continued)

*Primary Examiner* — Tadeese Hailu
*Assistant Examiner* — Shangao Zhang
(74) *Attorney, Agent, or Firm* — Campbell Stephenson LLP (57) ABSTRACT

A user interface display comprises a plurality of selectable icons and a control symbol in a toolbar. The control symbol can be selected by a user to display additional selectable icons within the toolbar. Incoming events, such as customer support requests or other work items, can be received from a communication server and displayed via a selectable icon or work button in the toolbar. The user interface can notify the user of the incoming event, such as by causing the work button to blink. The user can send a command to the communication server via the user interface relating to the event, such as accepting an incoming work item or releasing a telephone call. The communication server can perform the appropriate event response.

24 Claims, 8 Drawing Sheets

(51) Int. Cl.
*G06F 3/0482* (2013.01)
*H04M 3/51* (2006.01)
*G06F 9/44* (2006.01)
*H04N 5/445* (2011.01)

(52) U.S. Cl.
CPC .......... *H04M3/5183* (2013.01); *H04M 3/5191* (2013.01); *H04N 5/44543* (2013.01); *H04N 5/44582* (2013.01)

(56) References Cited

U.S. PATENT DOCUMENTS

| | | | | |
|---|---|---|---|---|
| 5,473,680 | A | 12/1995 | Porter | 379/221.15 |
| 5,506,898 | A | 4/1996 | Costantini et al. | 379/266 |
| 5,524,147 | A | 6/1996 | Bean | 379/265 |
| 5,555,365 | A | 9/1996 | Selby et al. | 395/159 |
| 5,594,791 | A | 1/1997 | Szlam et al. | 379/265 |
| 5,621,789 | A * | 4/1997 | McCalmont et al. | 379/265.06 |
| 5,699,361 | A | 12/1997 | Ding et al. | 370/431 |
| 5,715,412 | A | 2/1998 | Arituska et al. | 395/326 |
| 5,734,852 | A | 3/1998 | Zias et al. | 395/334 |
| 5,754,830 | A | 5/1998 | Butts et al. | 395/500 |
| 5,805,886 | A | 9/1998 | Skarbo et al. | 395/685 |
| 5,828,376 | A * | 10/1998 | Solimene et al. | 715/821 |
| 5,828,882 | A | 10/1998 | Hinckley | 395/680 |
| 5,852,732 | A | 12/1998 | Freund et al. | 718/101 |
| 5,884,032 | A | 3/1999 | Bateman et al. | 395/200.34 |
| 5,892,764 | A * | 4/1999 | Riemann et al. | 370/401 |
| 5,894,512 | A | 4/1999 | Zenner | 379/265 |
| 5,905,879 | A | 5/1999 | Lambrecht | 395/297 |
| 5,915,011 | A | 6/1999 | Miloslavsky | 379/219 |
| 5,928,325 | A | 7/1999 | Shaughnessy et al. | 709/206 |
| 5,946,399 | A | 8/1999 | Kitaj et al. | 380/49 |
| 5,961,620 | A | 10/1999 | Trent et al. | 710/105 |
| 5,964,836 | A | 10/1999 | Rowe et al. | 709/221 |
| 5,974,474 | A | 10/1999 | Furner et al. | 710/8 |
| 5,983,019 | A | 11/1999 | Davidson | 395/705 |
| 5,983,184 | A | 11/1999 | Noguchi | 704/270 |
| 6,058,435 | A | 5/2000 | Sassin et al. | 709/305 |
| 6,064,730 | A | 5/2000 | Ginsberg | 379/265 |
| 6,092,102 | A | 7/2000 | Wagner | 340/7.29 |
| 6,108,695 | A | 8/2000 | Chawla | 709/217 |
| 6,111,562 | A | 8/2000 | Downs et al. | 345/145 |
| 6,118,899 | A | 9/2000 | Bloomfield et al. | 382/233 |
| 6,134,318 | A | 10/2000 | O'Neil | 379/266 |
| 6,138,158 | A | 10/2000 | Boyle et al. | 709/225 |
| 6,154,209 | A | 11/2000 | Naughton et al. | 345/339 |
| 6,175,564 | B1 | 1/2001 | Miloslavsky et al. | 370/352 |
| 6,185,288 | B1 | 2/2001 | Wong | 709/206 |
| 6,199,104 | B1 | 3/2001 | Delph | 709/208 |
| 6,212,511 | B1 | 4/2001 | Fisher et al. | 701/1 |
| 6,215,865 | B1 * | 4/2001 | McCalmont | 379/212.01 |
| 6,243,452 | B1 | 6/2001 | O'Shaughnessey et al. | 379/201 |
| 6,263,066 | B1 | 7/2001 | Shtivelman et al. | 379/266 |
| 6,300,947 | B1 | 10/2001 | Kanevsky | 345/333 |
| 6,314,178 | B1 | 11/2001 | Walker et al. | 379/266.01 |
| 6,314,451 | B1 | 11/2001 | Landsman et al. | 709/203 |
| 6,332,154 | B2 | 12/2001 | Beck et al. | 709/204 |
| 6,337,858 | B1 | 1/2002 | Petty et al. | 370/356 |
| 6,360,368 | B1 | 3/2002 | Chawla | 725/94 |
| 6,389,132 | B1 | 5/2002 | Price | 379/265.01 |
| 6,393,475 | B1 | 5/2002 | Leong et al. | 709/223 |
| 6,449,260 | B1 | 9/2002 | Sassin et al. | 370/270 |
| 6,449,646 | B1 | 9/2002 | Sikora et al. | 709/226 |
| 6,463,292 | B1 | 10/2002 | Rahman | 455/466 |
| 6,480,600 | B1 | 11/2002 | Neyman et al. | 379/265.05 |
| 6,486,892 | B1 | 11/2002 | Stern | 345/760 |
| 6,489,951 | B1 | 12/2002 | Wong et al. | 345/173 |
| 6,493,446 | B1 | 12/2002 | Cherry | 379/265.05 |
| 6,493,695 | B1 | 12/2002 | Pickering et al. | 706/47 |
| 6,493,760 | B1 | 12/2002 | Pendlebury et al. | 709/229 |
| 6,505,166 | B1 | 1/2003 | Stephanou | 705/8 |
| 6,507,868 | B2 | 1/2003 | Simmon et al. | 709/219 |
| 6,587,556 | B1 | 7/2003 | Judkins et al. | 379/219 |
| 6,594,675 | B1 | 7/2003 | Schneider | 707/200 |
| 6,625,274 | B1 | 9/2003 | Hoffpauir et al. | 379/229 |
| 6,657,990 | B1 | 12/2003 | Dilip et al. | 370/352 |
| 6,681,010 | B1 | 1/2004 | Anderson et al. | 379/265.11 |
| 6,690,788 | B1 | 2/2004 | Bauer et al. | 379/242 |
| 6,691,162 | B1 | 2/2004 | Wick | 709/224 |
| 6,694,352 | B1 | 2/2004 | Omoigui | 709/205 |
| 6,704,409 | B1 | 3/2004 | Dilip et al. | 379/265.02 |
| 6,718,370 | B1 | 4/2004 | Coffman et al. | 709/212 |
| 6,718,393 | B1 | 4/2004 | Aditya | 709/239 |
| 6,731,609 | B1 | 5/2004 | Hirni et al. | 370/260 |
| 6,744,878 | B1 | 6/2004 | Komissarchik et al. | 379/265.03 |
| 6,747,970 | B1 | 6/2004 | Lamb et al. | 370/352 |
| 6,763,369 | B1 | 7/2004 | Ytuarte et al. | 709/201 |
| 6,763,384 | B1 | 7/2004 | Gupta et al. | 709/224 |
| 6,771,760 | B1 | 8/2004 | Vortman et al. | 379/209.01 |
| 6,771,765 | B1 | 8/2004 | Crowther et al. | 379/265.09 |
| 6,772,216 | B1 | 8/2004 | Ankireddipally et al. | 709/230 |
| 6,778,661 | B1 | 8/2004 | Yumoto et al. | 379/265.09 |
| 6,816,500 | B1 | 11/2004 | Mannette et al. | 370/431 |
| 6,816,880 | B1 | 11/2004 | Stent et al. | 709/202 |
| 6,823,384 | B1 | 11/2004 | Wilson et al. | 709/225 |
| 6,832,203 | B1 | 12/2004 | Villena et al. | 705/8 |
| 6,879,586 | B2 | 4/2005 | Turovsky et al. | 370/356 |
| 6,889,337 | B1 | 5/2005 | Yee | 714/1 |
| 6,895,558 | B1 | 5/2005 | Loveland | 715/746 |
| 6,944,272 | B1 | 9/2005 | Thomas | 379/88.13 |
| 6,963,783 | B1 | 11/2005 | Bi et al. | 700/94 |
| 6,978,311 | B1 | 12/2005 | Netzer et al. | 709/232 |
| 7,036,087 | B1 * | 4/2006 | Odom | 715/779 |
| 7,047,534 | B2 | 5/2006 | Sadovsky et al. | 719/322 |
| 7,051,066 | B1 | 5/2006 | Albert et al. | 709/202 |
| 7,089,497 | B2 | 8/2006 | Abbott et al. | 715/740 |
| 7,089,558 | B2 | 8/2006 | Baskey et al. | 718/104 |
| 7,092,509 | B1 * | 8/2006 | Mears et al. | 379/266.01 |
| 7,093,199 | B2 | 8/2006 | Cragun et al. | 715/763 |
| 7,120,675 | B1 | 10/2006 | Shupak et al. | 709/217 |
| 7,171,473 | B1 | 1/2007 | Eftis et al. | 709/227 |
| 7,263,547 | B2 | 8/2007 | Kloba et al. | 709/217 |
| 7,325,030 | B2 | 1/2008 | Wright et al. | 709/203 |
| 7,353,182 | B1 | 4/2008 | Missinhoun et al. | 705/8 |
| 7,373,313 | B1 * | 5/2008 | Kahle et al. | 705/26.3 |
| 7,392,540 | B1 | 6/2008 | Pell | 726/12 |
| 2001/0039596 | A1 | 11/2001 | Collin et al. | 709/321 |
| 2001/0042131 | A1 | 11/2001 | Mathon et al. | 709/238 |
| 2001/0054064 | A1 | 12/2001 | Kannan | 709/203 |
| 2002/0026335 | A1 | 2/2002 | Honda | 705/4 |
| 2002/0032809 | A1 | 3/2002 | Bateman et al. | 710/5 |
| 2002/0042845 | A1 | 4/2002 | Burmann et al. | 709/249 |
| 2002/0052954 | A1 | 5/2002 | Polizzi et al. | 709/225 |
| 2002/0055967 | A1 | 5/2002 | Coussement | 709/202 |
| 2002/0063735 | A1 * | 5/2002 | Tamir et al. | 345/745 |
| 2002/0072921 | A1 | 6/2002 | Boland et al. | 705/1 |
| 2002/0087385 | A1 | 7/2002 | Vincent | 705/10 |
| 2002/0122053 | A1 | 9/2002 | Dutta et al. | 345/729 |
| 2002/0144233 | A1 | 10/2002 | Chong et al. | 717/105 |
| 2002/0191029 | A1 | 12/2002 | Gillespie et al. | 345/810 |
| 2003/0009520 | A1 | 1/2003 | Nourbakhsh et al. | 709/204 |
| 2003/0014598 | A1 | 1/2003 | Brown | 711/141 |
| 2003/0018702 | A1 | 1/2003 | Broughton et al. | 709/202 |
| 2003/0023734 | A1 | 1/2003 | Martin et al. | 709/229 |
| 2003/0093533 | A1 | 5/2003 | Ezerzer et al. | 709/227 |
| 2003/0164848 | A1 | 9/2003 | Dutta et al. | 345/729 |
| 2004/0031030 | A1 | 2/2004 | Kidder et al. | 717/172 |
| 2005/0003812 | A1 | 1/2005 | Gladwin et al. | 455/426.1 |
| 2005/0010526 | A1 | 1/2005 | Takahashi et al. | 705/44 |

FOREIGN PATENT DOCUMENTS

| | | |
|---|---|---|
| WO | WO 97/16014 | 5/1997 |
| WO | WO 97/42728 | 11/1997 |
| WO | WO 00/49778 | 8/2000 |

OTHER PUBLICATIONS

International Search Report as mailed from the PCT on Jul. 12, 2002, for International Application No. PCT/US02/09879, 4 pages.

(56) References Cited

OTHER PUBLICATIONS

International Search Report as mailed from the PCT on Sep. 4, 2002, for International Application No. PCT/US02/10191, 4 pages.

Schmidt, et al, Experiences with an Object-Oriented Architecture for Developing Dynamically Extensible Distributed System Management Software, Nov. 28-Dec. 1994, pp. 500-506.

GW Micro, Inc. "Window-Eyes 4.0 User's Guide," Mar. 3, 2001, pp. 1-286, Available at http://web.archive.org/web/20010303133328/http:/www.gwmicro.com/wemanual/.

R. Fielding et al., Hypertext Transfer Protocol—HTTP/1.1; Jun. 1999, excerpted 4 pages.

Moloney et al., functions.cpp, Nov. 8, 2000: http://www.cs.uml.edu/~bill/C_Plus_Plus/calculator/functions.cpp, 1 page.

\* cited by examiner

APPARATUS AND METHOD FOR DISPLAYING SELECTABLE ICONS IN A TOOLBAR FOR A USER INTERFACE

CROSS-REFERENCE TO RELATED APPLICATIONS

This application is a divisional application of U.S. patent application Ser. No. 10/001,140 (now U.S. Pat. No. 8,091, 042), entitled "APPARATUS AND METHOD FOR DISPLAYING SELECTABLE ICONS IN A TOOLBAR FOR A USER INTERFACE," filed Nov. 15, 2001, and naming Mingte Chen, Anil Kumar Annadata, Kuang-Yang Huang, Rohit Bedi, and Henry Dana Jay as inventors. That application is assigned to Siebel Systems, Inc., the assignee of the present invention, and is hereby incorporated by reference, in its entirety and for all purposes.

BACKGROUND

Toolbars are typically provided in application programs such as word processing programs to provide a shortcut for accessing various features and options in the application program. The application programs often include a user interface that allows users to select one or more toolbars to display, and to configure the options to be included on the toolbars. The display area is typically divided into an area for toolbars and an area for presenting information to the user. Often, a user may include several toolbars on the display, which reduces the area that can be used to present information to the user.

A feature referred to in the art as "frames" are often used to create displays for user interfaces. A single user interface can be implemented with a number of frames, with each frame being allocated a fixed area on the display. Notably, text and graphics cannot be generated outside of the borders of the frame. Therefore, if a display window is generated with one frame, and a toolbar is generated in another frame above the display window, it is not possible to use pull-down menus in the toolbar that extend past the boundary of the toolbar's frame. This can substantially limit the number of options that can be implemented in a pull-down menu.

It is also desirable to provide a user interface with a toolbar that requires minimal space on a display, but allows the user to readily access the features and options in a system or application program.

SUMMARY

An apparatus and method in accordance with the present invention provide a toolbar in a user interface that includes one or more control symbols that can be selected to expand or contract the number of selectable icons displayed within the toolbar. This allows the user to access commonly used features of an interface with fewer toolbars, thereby leaving more space available for a display area.

In one embodiment, a set of instructions for generating a user interface comprising a toolbar in accordance with the present invention comprises a plurality of selectable icons and a control symbol that can be selected by a user to display additional selectable icons within the toolbar. The additional icons can be inserted adjacent the control symbol or in another location on the toolbar when the control symbol is selected.

In another embodiment, a method in accordance with the present invention allows the user to associate a set of one or more selectable icons with a control symbol. The control symbol is displayed on the toolbar at all times. The user can select the control symbol to control when the set of icons associated with the control symbol are displayed on the toolbar.

The set of icons can be displayed adjacent the control symbol or at any pre-specified position on the toolbar. In one implementation, reselecting the control symbol removes the additional icons from the toolbar. In another implementation, the additional icons are removed when one of the additional icons is selected. If the icons are positioned adjacent to their corresponding control symbol, the display position of other icons on the toolbar is adjusted to allow room for the additional icons. When a set of the additional icons are removed from the display, the position of the other icons on the display can be adjusted to remove open space between icons on the toolbar. The toolbar can include more than one control symbol, and more than one set of additional icons can be displayed simultaneously.

The methods in accordance with the present invention can be embodied in the form of computer-implemented processes and apparatuses for practicing those processes. The methods can also be embodied in the form of computer program code embodied in tangible media, such as floppy diskettes, CD-ROMS, hard drives, or any other computer-readable storage medium where, when the computer program code is loaded into and executed by a computer, the computer becomes an apparatus for practicing the invention. The method can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

The present invention may be better understood, and its numerous objects, features and advantages made apparent to those skilled in the art by referencing the accompanying drawings.

BRIEF DESCRIPTION OF THE FIGURES

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1A:
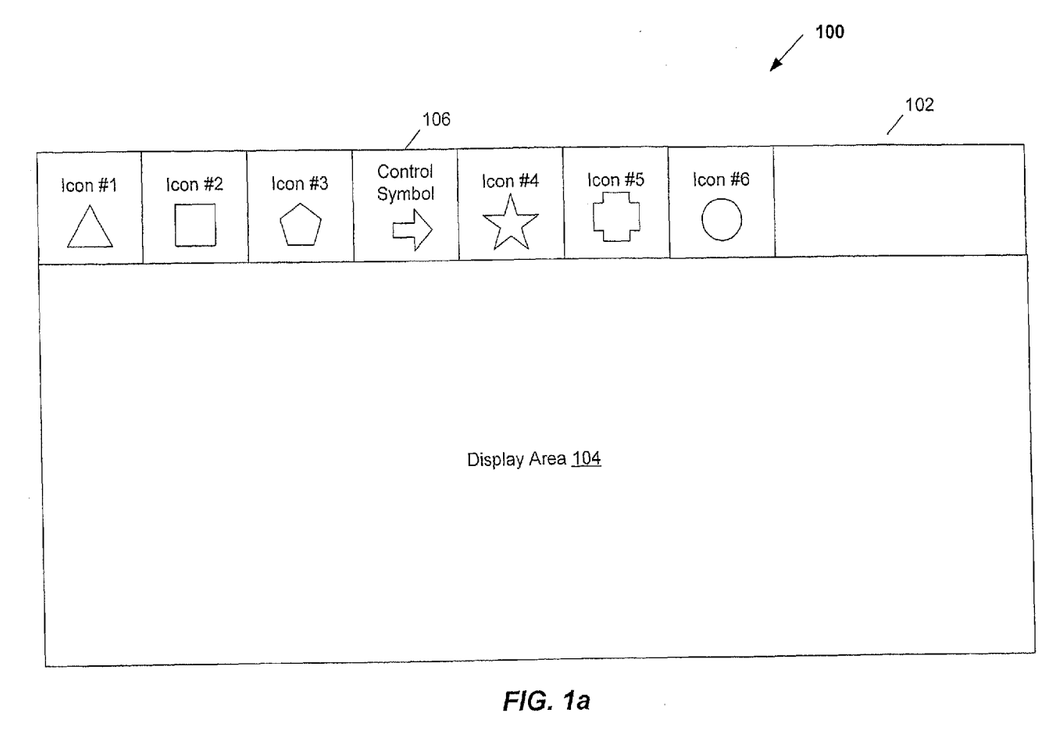
FIG. 1a shows a diagram of an embodiment of a user interface including a toolbar in accordance with the present invention.

FIG. 1a shows a diagram of an embodiment of a graphical user interface (GUI) 100 including a toolbar 102 in accordance with the present invention and a display area 104. The toolbar 102 includes one or more selectable icons (shown as Icons #1-6) and control symbols 106 that can be selected to increase the number of selectable icons in the toolbar 102. The Icons #1-6 are shown to exemplify various icons that can be included in the toolbar 102. The symbols shown on the Icons #1-6 are provided to help distinguish the icons from one another, but do not represent a particular function or feature. The icons that can be displayed on the toolbar 102 in accordance with the present invention is limited only by the features and options that are available in the particular application program with which the toolbar 102 can be utilized.

Figure 1B:
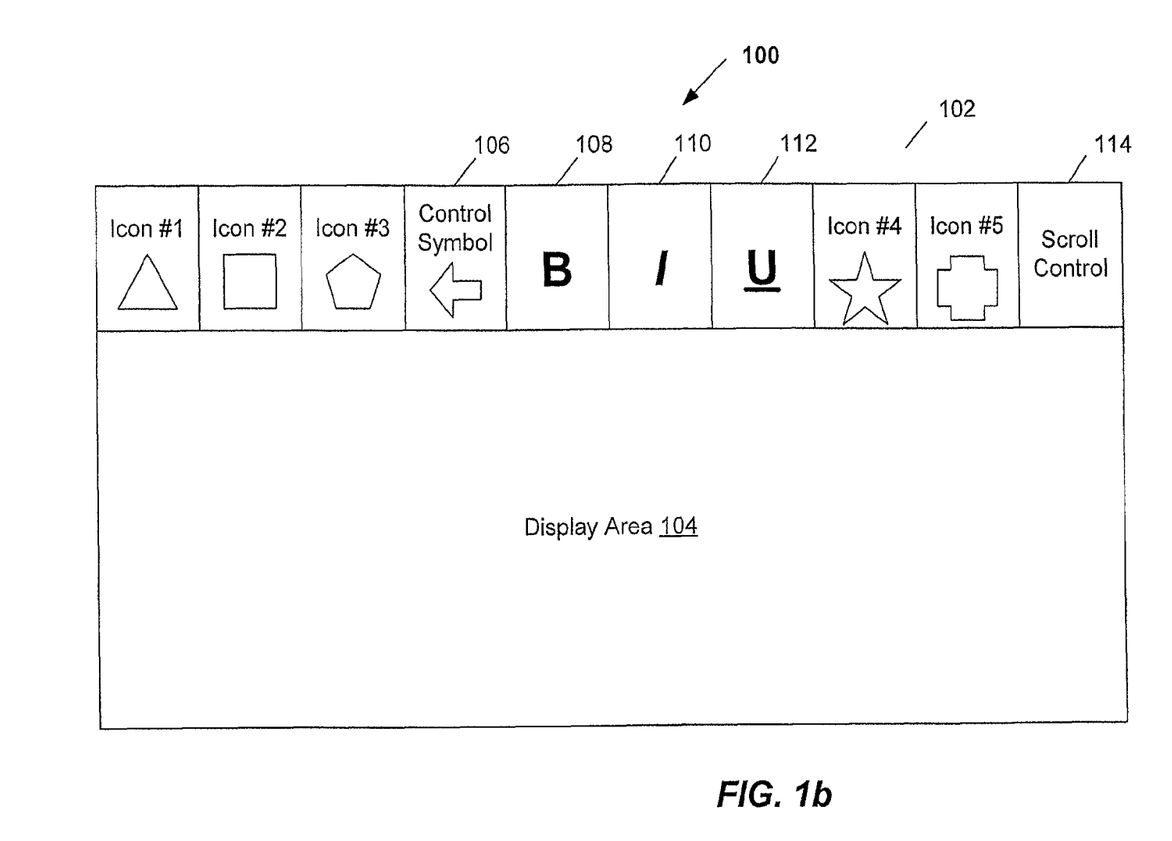
FIG. 1b shows a diagram of the user interface of FIG. 1a including a toolbar with additional icons displayed adjacent a control symbol in accordance with the present invention.

The toolbar 102 represents a variety of toolbars that can be implemented as described herein for a variety of application programs with a GM 100. For example, the toolbar 102 shown in FIG. 1b can be used in a word processing or spreadsheet application program wherein the control symbol 106 represents text formatting options. As shown in FIG. 1b, when the control symbol 106 is selected, icons representing text format options, such as icon 108 for bold text, icon 110 for italicized text, and icon 112 for underlined text, are displayed on the toolbar 102. The Icons #4-6 adjacent to the text formatting control symbol 106 are displaced to allow room to display the icons 108, 110, 112.

A scroll control symbol 114 can be included at the end of the toolbar 102 when there is not enough space to display all of the icons associated with the toolbar 102 on the GUI 100. The scroll control 114 can be selected to scroll the icons on the toolbar 102 to the left or right. This can force icons off the toolbar 102 at one end to allow the user to access the desired icon(s) at the other end.

In one implementation, the icons 108, 110, 112 can be displayed and selected until the user re-selects the control symbol 106. In an alternative implementation, the icons 108, 110, 112 can be removed when one of the icons 108, 110, 112 is selected. When the icons 108, 110, 112 are removed from the toolbar 102, the Icons #4-6 are returned to a position adjacent to the control symbol 106, as shown in FIG. 1a.

Some application programs allow a user to view several toolbars on the GUI 100 to provide shortcut access to various features and capabilities of the application program. The greater the number of toolbars included on the GUI 100, the less space there is available for the display area 104.

Advantageously, the toolbar 102 in accordance with the present invention can include one or more control symbols 106 for selectively expanding the number of icons on the toolbar 102. The user is able to access to commonly used features of the GM 100 with fewer toolbars. As a result, more space is available for the display area 104.

Additionally, expanding the icons within the toolbar 102 allows continuous viewing of the information in the display area 104. This contrasts with pull-down menus known in the art, which can block areas of the display area 104 while being utilized. The toolbar 102 in accordance with the present invention can thus be helpful when the user is trying to determine which icon to select based on the information in the display area 104.

Another advantage is that the toolbar 102 can be implemented using a feature referred to in the art as "frames." Since text and graphics for a frame cannot be generated outside of the frame's borders, pull-down menus, as provided with toolbars known in the prior art, are not feasible for use in frames. The toolbar 102 in accordance with the present invention avoids this disadvantage of the prior art by allowing the user to select the control symbol 106 to selectively expand and remove the number of options, or icons, included in the toolbar 102.

Notably, the toolbar 102 can be implemented in horizontal and/or vertical directions. Further, the selectable icons in the toolbar 102 can include text to describe the option instead of, or in addition to, a graphic symbol. Alternatively, text describing the option can be presented when a pointer, such a cursor, is positioned near an icon.

A user interface (not shown) for configuring the icons to display when the control symbol 106 is selected can also be provided. The user interface for configuring the icons can allow the user store sets of icons with an associated control symbol 106. The stored sets of icons can be included in different toolbars. A default set of icons associated with the control symbol 106 can also be provided. The user interface (not shown) can also allow the user to modify the default set of icons.

Figure 2:
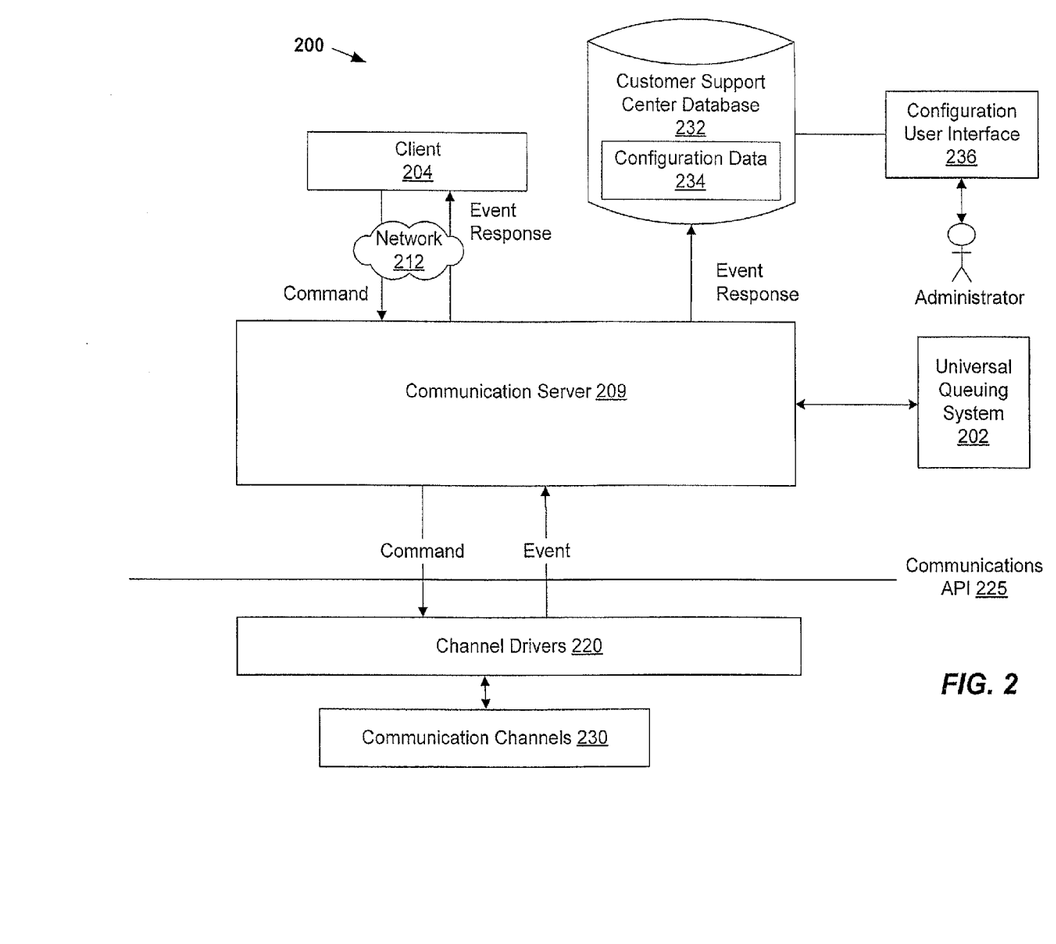
FIG. 2 is a block diagram of an example of a communication system with which a toolbar in accordance with the present invention can be utilized.

FIG. 2 is a block diagram of an example of a communication system 200 in which a toolbar in accordance with the present invention can be utilized. Communication system 200 enables agents to respond to customer support requests and/or information requests via multiple communication channels of different media types. These media types include, but are not limited to, telephone, email, fax, web collaboration, Internet call me now and call me later, web chat, wireless access protocol, paging, and short messaging services. The term customer is used herein to include individuals and contact persons at businesses that are customers of the company, potential customers and other persons with whom a customer support agent communicates.

Communication system 200 includes a universal queuing (UQ) system 202 capable of assigning, routing, and queuing work items from multiple channels of communication to an agent having the appropriate skills to respond to a customer support request. The term work item refers to a request from a customer that requires a response from an agent assigned by communication system 200, such as responding to a customer support request in the form of a telephone call, email, fax or other communication of a different media type. A work item can be initiated when an event such as an incoming customer support request arrives or by an agent using a user interface to communication system 200.

Communication system 200 also includes a communication server 209 that enables agents to use communication channels of different media types to communicate with customers. Communication server 209 handles events such as the arrival of incoming customer support requests from channel drivers 220. Each channel driver 220 communicates with a communication channel 230.

Interaction between UQ system 202 and communication server 209 occurs when, for example, communication server 209 receives and routes an incoming customer request as a work item to UQ system 202 for assignment to an agent via a client 204. UQ system 202 assigns an agent to the work item and sends the work item back to communication server 209 for communication to the assigned agent. Client 204 can include a web browser program such as Microsoft's Internet Explorer or other user interface program that can be implemented with a computer system connected to communication server 209 via a communication network (not shown).

Communication server 209 handles all communication between agents and customers via communication channels 230 of one or more media types. Communication server 209 is not media-specific and has no knowledge of communication channels or media.

Multiple communication channels 230 of different media types each have a corresponding channel driver 220 that interfaces with communication server 209 via a communication application program interface (API) 225. Communication API 225 translates commands and events in channel drivers 220 to commands and events recognized by the communication server 209. Events provide information regarding activity of a specific communication channel 230.

Communications API 225 enables communications server 209 to operate independently of the media type of the communication channels 230 and specific protocols to communicate with communication devices. Customers are thus able to use a variety of different communication channels 230 and channel drivers 220 while taking advantage of centralized customer support center management features and multi-media communication channel capabilities of communication server 209.

Communication server 209 receives incoming events such as customer support requests and communicates interactively with the agent by controlling a user interface presented to the agent. When an event such as the arrival of an incoming telephone call occurs, the user interface notifies the agent. When the agent accepts the telephone call, puts a call on hold, or releases a call, the agent sends a command to the communication server 209 via the user interface. The communication server 209 issues the command to the channel driver 220 associated with the communication channel 230 for the telephone call.

When the agent performs an activity using the client 204 that requires a command to be executed, the communication server 209 searches command tables in the configuration data 234, and collects the data associated with that command. The communication server then determines which of channel drivers 220 performs the command requested by the client 204, and passes the command and data to the channel driver 220 for execution via the communications API 225.

The communication server 209 is further described in the U.S. patent application Ser. No. 09/823,835, filed Mar. 31, 2001, entitled "Multi-Channel Media Independent Server" and naming Mingte Chen, Anil K. Annadata, and Leon Chan as inventors, the application being incorporated herein by reference in its entirety.

Figure 3:
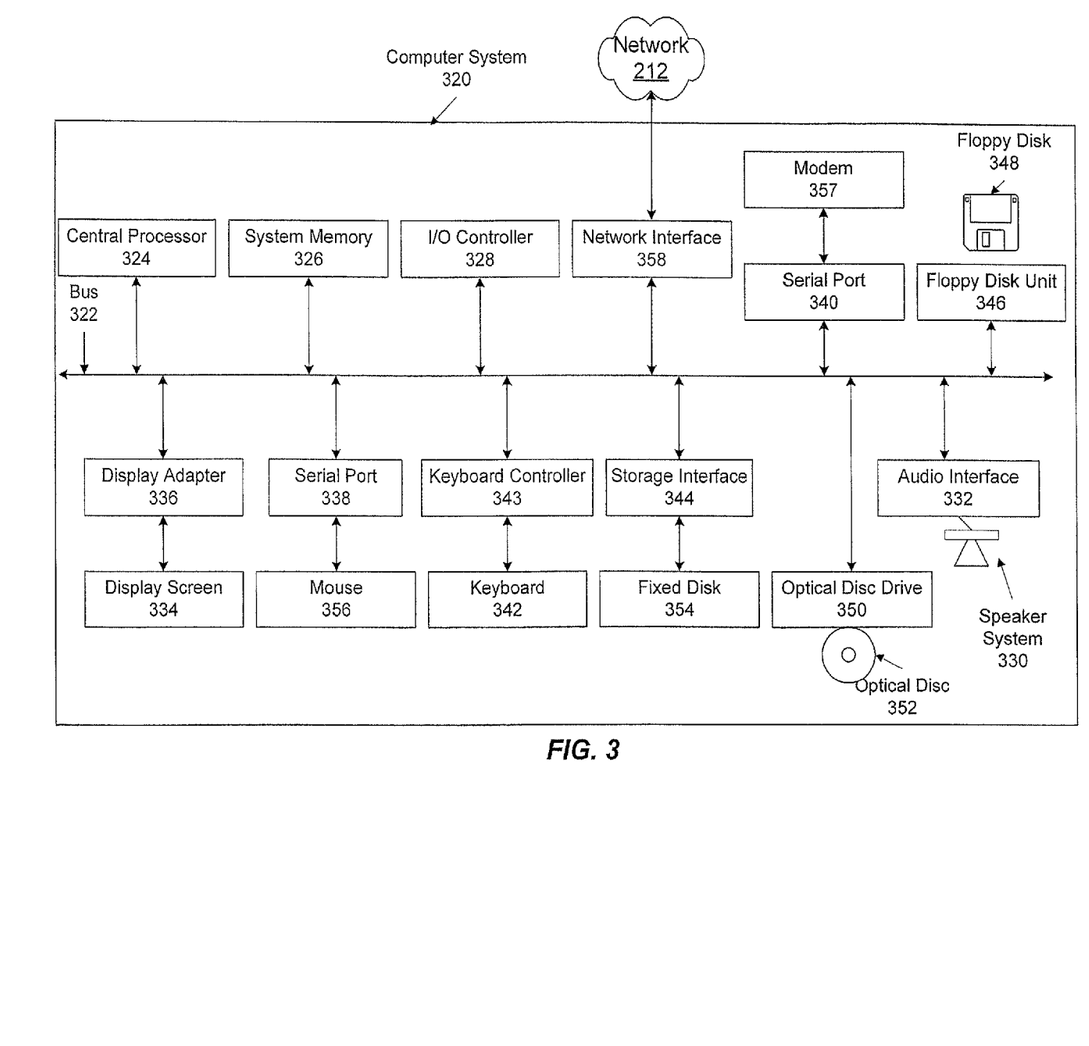
FIG. 3 shows an example of a computer system which can be utilized to implement the communication server and the client shown in FIG. 2.

FIG. 3 shows an example of a computer system 320 which can be utilized to implement the communication server 209 and the client 204 shown in FIG. 2.

Computer system 320 includes a bus 322 which interconnects major subsystems of computer system 320 such as a central processor 324, a system memory 326 (typically RAM, but which may also include ROM, flash RAM, or the like), an input/output controller 328, an external audio device such as a speaker system 330 via an audio output interface 332, an external device such as a display screen 334 via display adapter 336, serial ports 338 and 340, a keyboard 342 (interfaced with a keyboard controller 343), a storage interface 344, a floppy disk drive 346 operative to receive a floppy disk 348, and an optical disc drive 350 operative to receive an optical disc 352. Also included are a mouse 356 (or other point-and-click device, coupled to bus 322 via serial port 338), a modem 357 (coupled to bus 322 via serial port 338) and a network interface 358 (coupled directly to bus 322).

Bus 322 allows data communication between central processor 324 and system memory 326, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 320 are generally stored on and accessed via a computer readable medium, such as a hard disk drive (e.g., fixed disk 354), an optical drive (e.g., CD-ROM drive 350), floppy disk unit 346 or other storage medium. Additionally, applications may be in the form of electronic signals modulated in accordance with the application and data communication technology when accessed via network modem 357 or network interface 358.

Storage interface 344, as with the other storage interfaces of computer system 320, may connect to a standard computer readable medium for storage and/or retrieval of information, such as a fixed disk drive 354. Fixed disk drive 354 may be a part of computer system 320 or may be separate and accessed through other interface systems. Many other devices can be connected such as the mouse 356 connected to bus 322 via serial port 338, a modem 357 connected to bus 322 via serial port 340 and the network interface 358 connected directly to bus 322. Modem 357 may provide a direct connection to a remote server via a telephone link or to the Internet via an internet service provider (ISP). Network interface 358 may provide a direct connection to a remote server, such as between the communication server 209 and the client 204 via a direct network link to the Internet via a POP (point of presence). Network interface 358 may provide such connection using various communication links, such as a dial-up wired connection with a modem, a direct link such as a T1, ISDN, or cable line, a wireless connection through a cellular or satellite network, or a local data transport system such as Ethernet or token ring over a local area network.

Many other devices or subsystems (not shown) may be connected in a similar manner (e.g., bar code readers, document scanners, digital cameras and so on). Conversely, it is not necessary for all of the devices shown in FIG. 3 to be present to practice the present invention. The devices and subsystems may be interconnected in different ways from that shown in FIG. 3. The operation of a computer system such as that shown in FIG. 3 is readily known in the art and is not discussed in detail in this application. Code to implement the present invention may be stored in computer-readable storage media such as one or more of system memory 326, fixed disk 354, CD-ROM 352, or floppy disk 348. Additionally, computer system 320 may be any kind of computing device, and so includes personal data assistants (PDAs), network appliance, desktop, laptop, X-window terminal or other such computing device. The operating system provided on computer system 320 may be MS-DOS®, MS-WINDOWS®, OS/2®, UNIX®, Linux® or other known operating system. Computer system 320 also supports a number of Internet access tools, including, for example, an HTTP-compliant web browser having a JavaScript interpreter, such as Netscape Navigator® 3.0, Microsoft Explorer® 3.0 and the like.

Multiple computer systems 320 can be communicate with one another via the network 307. One or more of the computer systems 320 can be utilized to implement a user interface via the client 204, while one or more of the computer systems 320 can be utilized to implement the communication server 209 (FIG. 2).

Moreover, regarding the signals described herein, those skilled in the art will recognize that a signal may be directly transmitted from a first component to a second component, or a signal may be modified (e.g., amplified, attenuated, delayed, latched, buffered, inverted, filtered or otherwise modified) between the components. Although the signals of the above described embodiment are characterized as transmitted from one component to the next, other embodiments of the present invention may include modified signals in place of such directly transmitted signals as long as the informational and/or functional aspect of the signal is transmitted between components. To some extent, a signal input at a second component may be conceptualized as a second signal derived from a first signal output from a first component due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
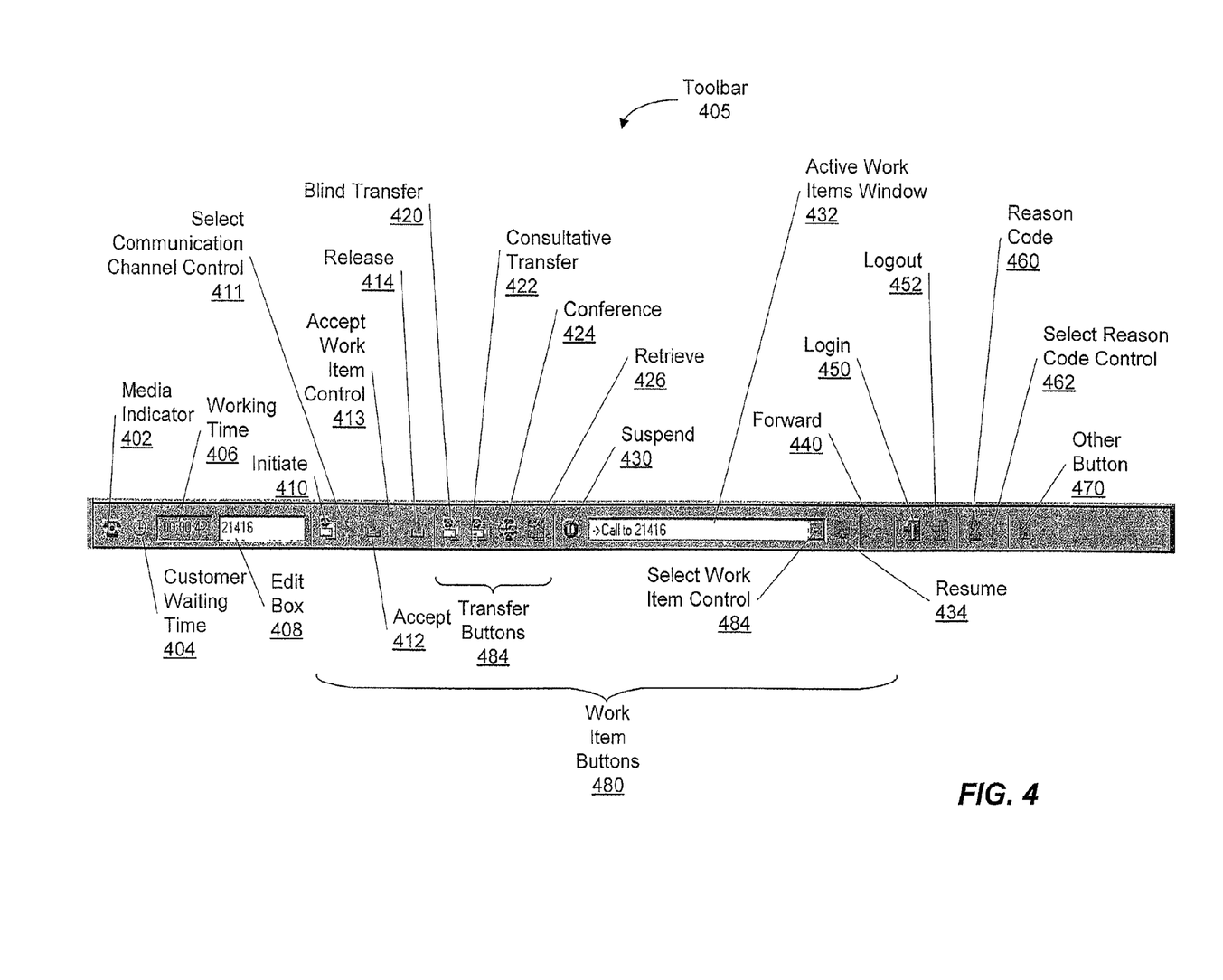
FIG. 4 shows a diagram of an embodiment of a user interface for an agent to communicate with the communication server of FIG. 2.

Referring now to FIG. 4, an example of an embodiment of a toolbar 405 that can be provided in a user interface by the client 204 is shown. Because toolbar 405 provides a single user interface for the agent to communicate using multiple communication channels of different media types, this embodiment of toolbar 405 includes a media indicator button 402 to show the media type of the currently active work item. Customer waiting time button 404 shows the amount of time that the customer has been waiting to receive a response to his or her customer support request associated with the work item. This information allows the agent to be responsive to the customer, for example, by apologizing when the customer has been waiting for a long time on hold on the telephone. Working time window 406 shows the amount of time the agent has spent working on the currently active work item. Edit box 408 allows the user to enter a small command, such as an extension number for dialing the telephone or a short message to be sent via short messaging service.

Work item buttons 480 includes buttons for enabling the agent to manage all of his or her active work items for all media types and communication channels.

Initiate work item button 410 enables the agent to initiate a work item.

For example, the user of toolbar 405 can choose to use media types such as the telephone, email, fax, or paging. Media types available to the user are determined by the communication server 209 by accessing customer support center database 330 to obtain the customer support center configuration to which the agent belongs and the agent's limitations to eliminate the media types of the communication channels for which the agent cannot access.

The icon shown on initiate button 410 includes symbols representing multiple media types including telephone, email, and paging. The icon is used to show that the initiate work item is an abstract icon representing a work item for any media type. If the agent clicks on the initiate button 410 when displaying the abstract icon, toolbar 405 will determine from the context of the toolbar what the agent is trying to do. For instance, if the user is currently on the telephone with a customer, media indicator button 402 will show a telephone. If the agent simultaneously is viewing an email address for a contact and the user clicks on the initiate work item button, toolbar 405 will determine that, because the agent is already on the telephone and the contact has an email address, the agent must be trying to send an email to the contact. Toolbar 405 can be configured so that the new email screen is loaded with the customer information in order to save the agent time in typing the email. Toolbar 405 is configurable by an administrator using a configuration user interface 340.

Sources of context for controlling toolbar 405 include the content of the database record(s) currently being presented by toolbar 405, the content of edit box 408 or other data entered by the agent, and the toolbar 405 user interface object or data currently selected by the agent. For example, if the agent types a string including an @ sign in edit box 408, toolbar 405 can be configured to predict that the agent is trying to send an e-mail and provide a window for entering email data.

The context-sensitivity of toolbar 405 is also configurable by an administrator by defining methods to be executed when an user interface object on toolbar 405 is activated using a configuration user interface 340. Therefore, context can also be based on company needs because the company can configure the toolbar 405 to operate using data-dependent criteria, for example, depending upon the volume of customer support requests being received. Toolbar 405 has the capability to traverse the commands associated with each button contained within to determine a command that applies to the agent's current context.

Accept work item button 412 allows the user to accept an incoming work item. Notification of an incoming work item is provided by toolbar 405 using a notification function. For example, the notification function can cause a button on toolbar 405 to blink when the agent has an incoming work item. When the agent accepts a work item, a command is sent by web browser client 204 to communication channel 230, which responds to the command by performing the command.

Accept work item control 413 enables the agent to select from a list of incoming work items. Release work item button 414 is used to release an active work item. The communication server 209 can be configured to release the telephone call work item automatically when the agent hangs up the telephone handset without clicking the release work item button 414. The hardware controlling the telephone connection sends a disconnect signal to the telephone switch to disconnect the agent's and customer's telephone lines.

For communication system 200, and particularly UQ system 102, to be aware that the telephone work item has been released, the communication server 209 must be aware of the physical disconnection. Channel driver 220 associated with the communication channel including the telephone switch is listening to the communication channel 230 and detects the physical disconnection of the telephone lines. In response, channel driver 220 sends a "line disconnected" event to the communication server 209. The communication server 209 performs the appropriate event response and notifies UQ system 202 that the work item has been released.

Transfer buttons 484 are related to transferring work items such as telephone calls. Blind transfer button 420 enables the agent to transfer a telephone call to another extension and hang up without confirming whether an agent at the extension accepted the telephone call. If the telephone call is not accepted by another agent, the communication server 209 can be configured to send the telephone call as a work item to UQ system 202 for placement into a queue of work items. The telephone call is removed from the transferring agent's list of active work items.

Consultative transfer button 422 enables an agent to consult with an agent at another extension before the call is transferred and to keep the telephone call if the other agent does not answer. Conference button 424 enables the agent to connect more than two telephone lines together for a joint telephone conversation. Retrieve button 426 enables the agent to retrieve a telephone call that the agent has transferred.

Suspend button 430 enables an agent to suspend a work item; for example, put a telephone call on hold or suspend writing an email response, to work on another work item or take a break. Active work items window 432 enables the agent to see the currently active work item. Select work item control 484 enables the agent to select a work item from the list of work items currently assigned to the agent. Resume button 434 allows the agent to resume work on a work item selected from the list of work items.

Forward button 440 applies to media types such as telephones and email. All telephone calls to a particular telephone number can be automatically forwarded to another telephone number when, for example, an agent is away from his usual work location. In the context of media types such as email, forward button command 440 can be configured to operate as a forward command, retaining a copy of the original email or as "transfer" of the email removing the email from the agent's inbox and from the agent's list of active work items. Toolbar 405 can be configured to issue a command to notify UQ system 202 accordingly.

Login button 450 allows the agent to login to the communication system 200 to work on work items. A persistent connection is established between the client 204 used by the agent and each communication channel 230 that the agent is authorized to use.

Logout button 452 allows the agent to logout from the communication system 200.

Because the communication system 200 is designed to monitor and provide real time information to agents, the agent needs a means of communicating his or her availability to accept work items from the communication system 200. Reason code button 420 allows the agent to toggle between ready and not ready states for each media type. Select reason code control 462 allows the user to select from a list of reason codes when the agent is not ready to accept work items. Reason codes can be used by managers of the customer support center to monitor the efficiency of agents in providing customer support.

Other button 470 is provided to allow a company to provide other functionality via toolbar 405. Because the operation of each button of toolbar 405 is configurable by the company by associating the user interface object with a command using the configuration user interface 340, toolbar 405 provides maximum flexibility in providing its customer support center with a tool for communicating via multiple communication channels of different media types.

Figure 5:
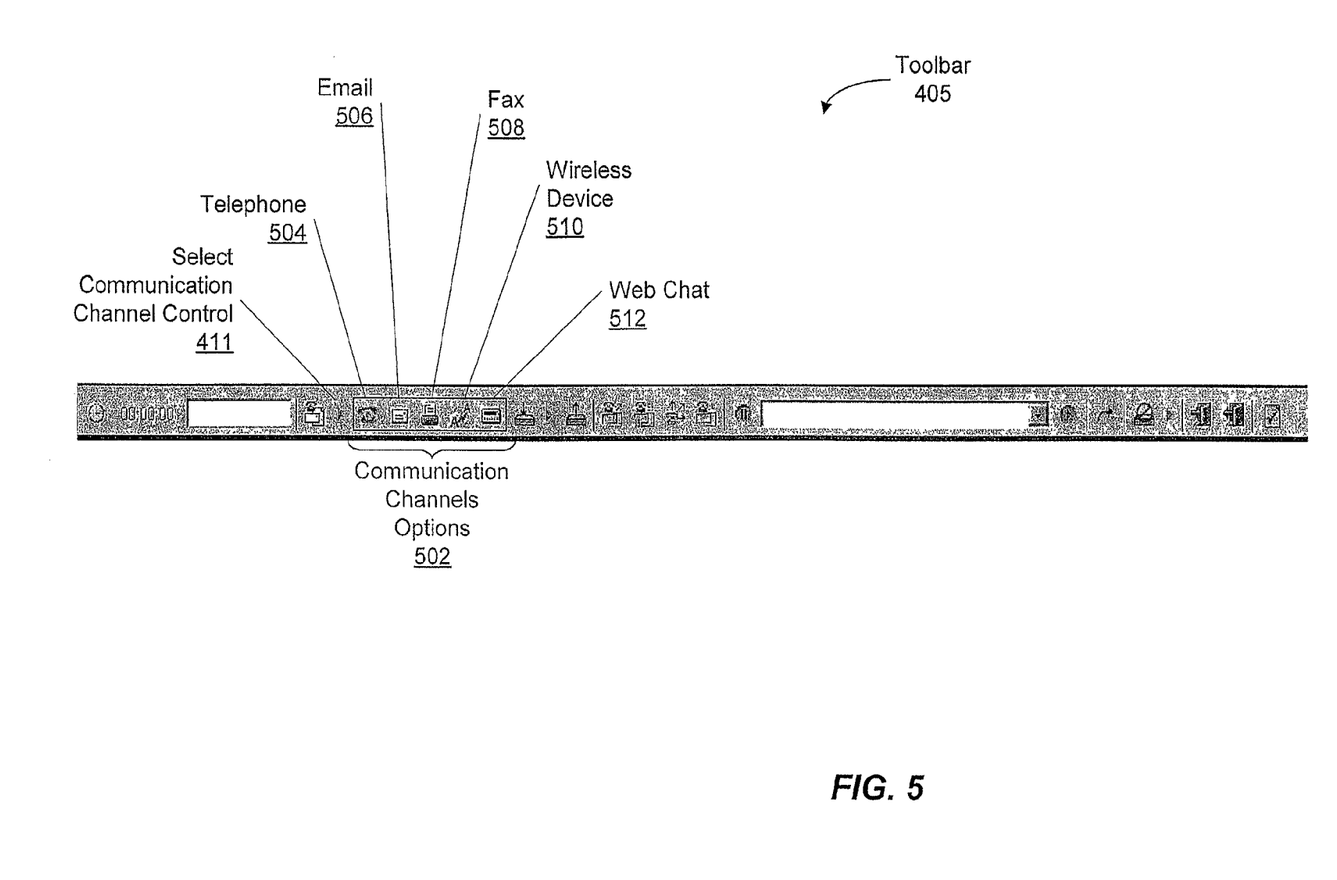
FIG. 5 shows a diagram of the user interface of FIG. 4 with options that are presented in accordance with the present invention when the select communication channel control is selected.

Select communication channel control 411 enables the user to select a media type for initiating a work item request. FIG. 5 shows an embodiment of the toolbar 405 in accordance with the present invention that is displayed when the select communication channel control 411 is selected. In the example shown, communication channel options 502 include telephone option 504, email option 506, fax option 508, wireless communication option 510, and web collaboration option 512. The communication channel options 502 depend on the media types that have been included for the particular agent in the configuration data 234 (FIG. 2).

It is important to note that when the communication channel control 411 is selected, the communication channel options 502 for the agent are displayed adjacent to the communication channel control 411. The rest of the icons on the toolbar 405 are displaced to allow room for the communication channel options 502 to be displayed. In the example shown, the direction of the arrow symbol representing the communication channel control 411 indicates the direction in which the communication channel options 502 will be displayed on the toolbar 405.

In some embodiments, selecting one of the communication channel options 502 causes the communication channel options 502 to be removed from the display. In other embodiments, the direction of the arrow representing the select communication channel control 411 changes direction when the select communication channel control 411 is selected. This provides an indication that the communication channel options 502 remain on the display until the communication channel control 411 is selected again. With this implementation, the agent can change communication channels without selecting the communication channel control 411 first.

Figure 6:
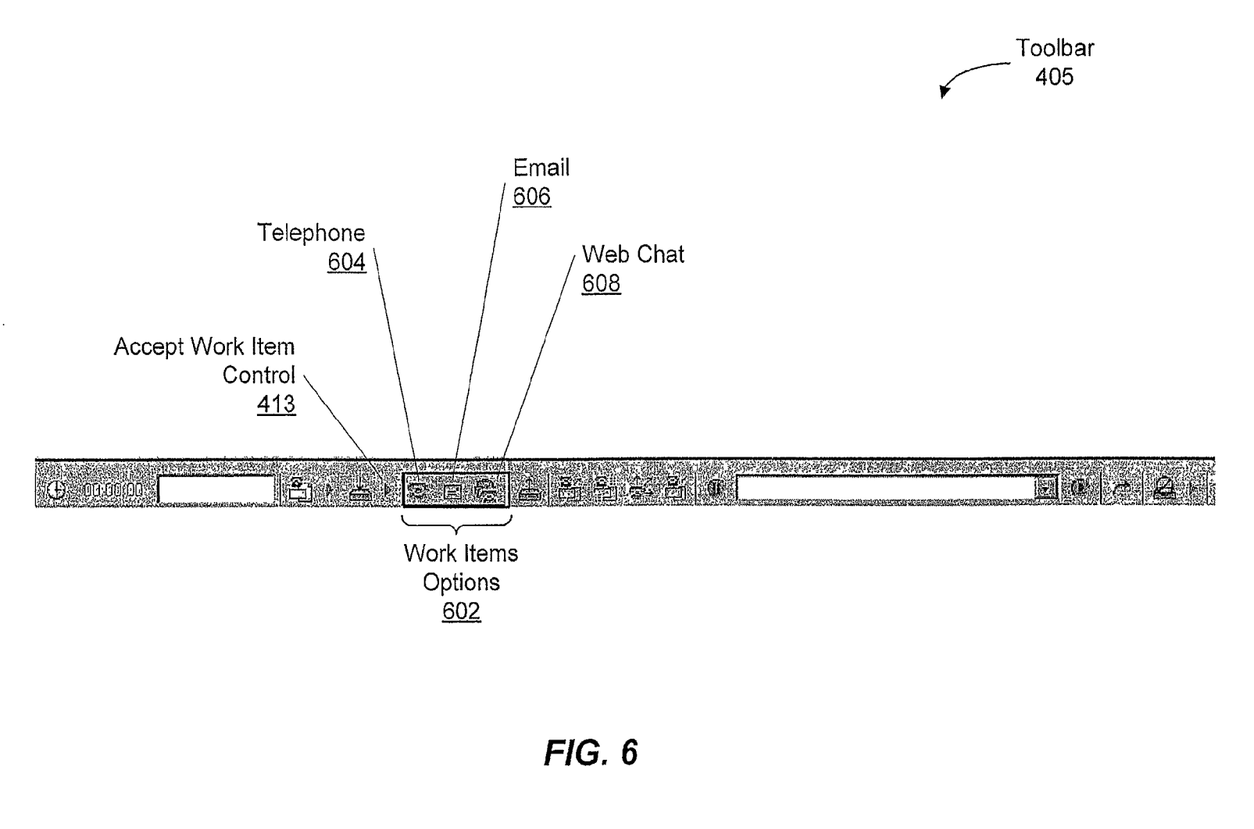
FIG. 6 shows a diagram of the user interface of FIG. 4 with options that are presented in accordance with the present invention when the accept work item control is selected.

Additional sets of icons can be associated for other control symbols on the toolbar 405. For example, FIG. 6 shows an embodiment of the toolbar 405 in accordance with the present invention that is displayed when the agent selects the accept work item control 413. In the example shown, a list of work item options 602 include telephone option 604, email option 606, and web collaboration option 608. Other icons can be included in the work item options 602 based on the work items queued for a particular agent by the universal queuing system 202 (FIG. 2).

In the embodiments shown in FIG. 6, the work items options 602 are displayed horizontally, and the rest of the icons on the toolbar 405 are displaced horizontally to the right. The direction of the arrow symbols representing the accept work item control 413 indicates the direction in which the work items options 602 will be displayed on the toolbar 405.

In some embodiments, selecting one of the work items options 602 causes the work items options 602 to be removed from the toolbar 405. In other embodiments, the direction of the arrow representing the accept work item control 413 changes direction when the accept work item control 413 is selected. This provides an indication that the work items options 602 remain on the display until the accept work item control 413 is selected again. With this implementation, the agent can accept a new work item without selecting the accept work item control 413 first.

Figure 7:
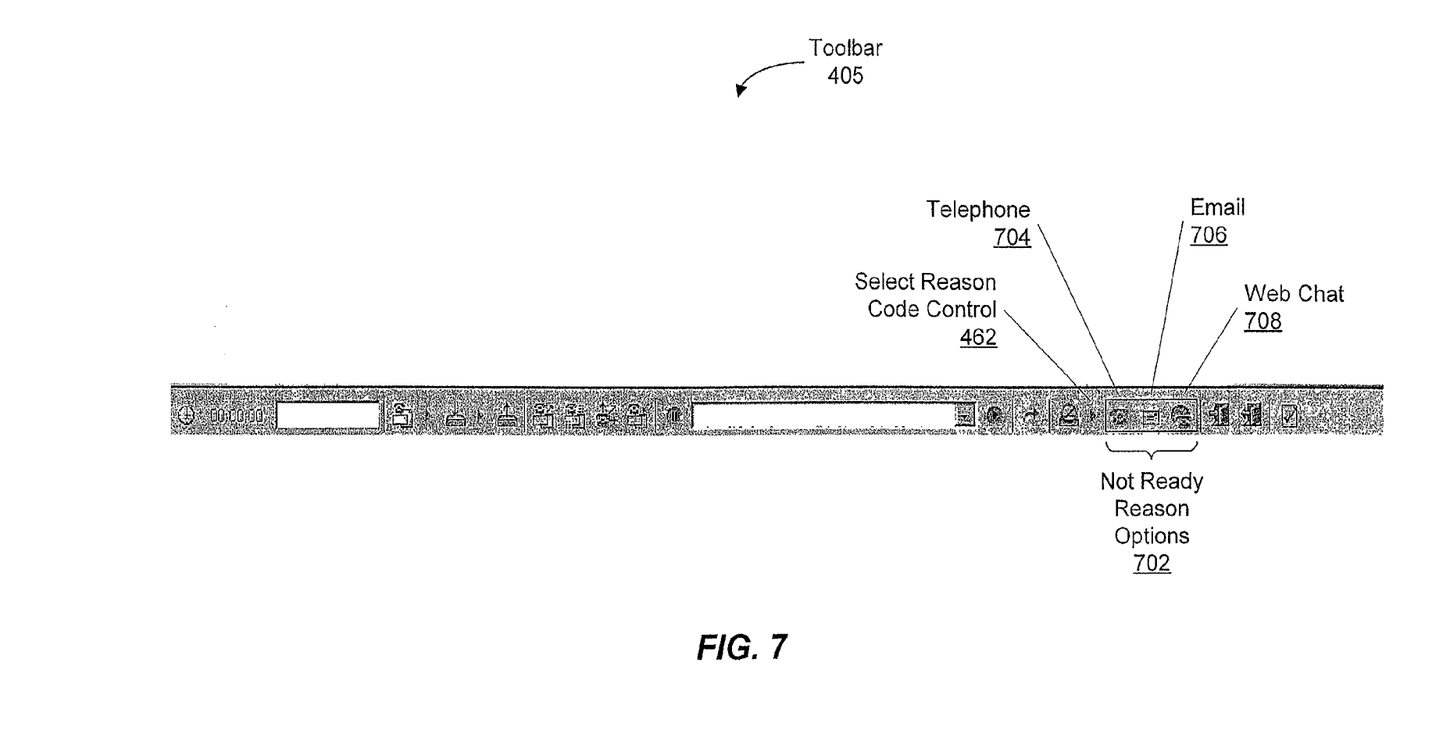
FIG. 7 shows a diagram of the user interface of FIG. 4 with options that are presented in accordance with the present invention when the select reason code control is selected.

FIG. 7 shows an embodiment of the toolbar 405 in accordance with the present invention that is displayed when the agent selects the select reason code control 462. A list of not ready reasons 702 allows the agent to indicate why he or she is not ready to accept work items. In the example shown, the reasons 702 allow the agent to indicate why he or she is currently busy by selecting a telephone option 704, an email option 706, or a web chat option 708 to indicate that the agent is currently handling another work item via the communication media corresponding to the not ready reason 702 selected.

In the embodiments shown in FIG. 7, the not ready reason options 702 are displayed horizontally, and the rest of the icons on the toolbar 405 are displaced horizontally to the right. The direction of the arrow symbols representing the select reason code control 462 indicates the direction in which the not ready reason options 702 will be displayed on the toolbar 405.

In some embodiments, selecting one of the not ready reason options 702 causes the not ready reason options 702 to be removed from the display. In other embodiments, the direction of the arrow representing the select reason code control 462 changes direction when the select reason code control 462 is selected. This provides an indication that the not ready reason options 702 remain on the display until the select reason code control 462 is selected again. With this implementation, the agent can change not ready reasons without selecting the select reason code control 462 first.

The toolbar 402 as described herein provides many advantages, such as enabling an agent to receiving incoming and send outgoing communication via multiple communication channels of different media types. Customer support requests are received and presented to an agent, along with information providing context about the customer and the nature of the support request, are provided to the user in real time as the customer support request arrives. The agent uses this information to determine whether to accept the work item. The toolbar 402 also allows the agent to manage active work items. For example, the agent can initially accept a work item, and then if the agent finds that a work item should be handled by another agent, transfer the work item to the other agent or place the work item in a queue to be assigned to an expert in a particular area. The user interface provides the agent with tools for tracking the efficiency and progress in responding to customer support requests. The toolbar 402 also includes one or more control symbols that allows the agent to include or remove additional icons from the toolbar on an as-needed basis, thereby eliminating the need for additional toolbars and leaving more space available on the display for information that is more useful to the agent.

Other Embodiments

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable media such as floppy disks and CD-ROM and transmission media such as digital and analog communication links, as well as media storage and distribution systems developed in the future.

Additionally, the foregoing detailed description has set forth various embodiments of the present invention via the use of block diagrams, flowcharts, and examples. It will be understood by those within the art that each block diagram component, flowchart step, operation and/or element illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

We claim:

1. An apparatus comprising:
a processor; and
a computer-readable storage medium coupled to the processor, wherein the computer-readable storage medium stores a set of instructions operable by the processor to generate a toolbar comprising a plurality of icons, wherein
 a first icon of the plurality of icons corresponds to a mode of response to a work item,
 the mode of response corresponds to one of a plurality of media types,
 each of the plurality of media types corresponds to a respective communication channel of a plurality of communication channels,
 the work item refers to a request to perform an item of work,
 the set of instructions operable to generate the toolbar are comprised in a communication server that is configured to send commands to, and receive events from, the plurality of communication channels via a plurality of communication channel drivers,
 the toolbar is generated by the communication server such that the toolbar is configured to be displayed on a client computer,
 the communication server is configured to
  receive a first incoming event from a first channel driver associated with a first communication channel of the plurality of communication channels,
  send an indication of the first incoming event to the toolbar, wherein
   the indication is displayed on the toolbar,
  receive a first command associated with the first icon, wherein
   the first icon is configured to cause the first command to be sent from the client computer, upon selection of the first icon,
  in response to receiving the first command, send the first command to the first channel driver, wherein
   the first channel driver executes the first command using the first communication channel.

2. The apparatus of claim 1 further comprising:
instructions operable to generate a release work item icon to allow an agent to release an active work item.

3. The apparatus of claim 1 further comprising:
instructions operable to generate a transfer icon to allow an agent to transfer the work item.

4. The apparatus of claim 1 further comprising:
instructions operable to generate a blind transfer icon to allow an agent to transfer a telephone call to another extension and hang up without confirming whether another agent at the other extension accepted the telephone call.

5. The apparatus of claim 1 further comprising:
instructions operable to generate a consultative transfer icon to allow an agent to consult with another agent at another extension before a telephone call is transferred and to keep the telephone call if the other agent does not answer.

6. The apparatus of claim 1 further comprising:
instructions operable to generate a conference icon to enable an agent to connect more than two telephone lines together for a joint telephone conversation.

7. The apparatus of claim 1 further comprising:
instructions operable to generate a retrieve icon to enable an agent to retrieve a telephone call that the agent has transferred.

8. The apparatus of claim 1 further comprising:
instructions operable to generate a suspend icon to enable an agent to suspend a work item.

9. The apparatus of claim 1 further comprising:
instructions operable to generate one or more control icons configured to support display and removal of additional icons in the toolbar, wherein one of the control icons is a select work item control icon to enable an agent to select a work item from a list of work items currently assigned to the agent.

10. The apparatus of claim 1, further comprising instructions operable to generate one or more control icons, wherein one of the control icons is a reason code icon to allow an agent to select from a list of reason codes when the agent is not ready to accept work items.

11. The apparatus of claim 1, further comprising instructions operable to generate one or more control icons, wherein one of the control icons is a select communication channel control icon to enable an agent to select a media type for initiating a work item request.

12. The apparatus of claim 11, further comprising instructions operable to generate one or more control icons configured to support display and removal of additional icons in the toolbar, wherein the additional icons that are displayed when the select communication channel control icon is selected includes at least one of: a telephone icon, an email icon, a fax icon, a wireless communication icon, and a web collaboration icon.

13. The apparatus of claim 1 further comprising:
instructions operable to generate one or more control icons configured to support display and removal of additional icons in the toolbar, and
instructions operable to insert at least a portion of the additional icons adjacent to one of the control icons when the one of the control icons is selected.

14. The apparatus of claim 13 further comprising instructions operable to remove at least a portion of the additional icons from the toolbar when the one of the control icons is re-selected.

15. The apparatus of claim 1 further comprising instructions operable to generate one or more control icons configured to support display and removal of additional icons in the toolbar,
instructions operable to adjust a position of at least one of the plurality of icons, and
instructions operable to insert at least one of the additional icons adjacent to one of the control icons when the one of the control icons is selected.

16. The apparatus of claim 15 further comprising instructions operable to:
remove the at least one of the additional icons from the toolbar when the one of the control icons is re-selected, and
readjust the position of the at least one of the plurality of icons to be adjacent to the one of the control icons.

17. The apparatus of claim 15 further comprising instructions operable to:
remove the at least one of the additional icons from the toolbar when the at least one of the additional icons is selected.

18. The apparatus of claim 15 further comprising instructions operable to:
remove the at least one of the additional icons from the toolbar when the at least one of the additional icons is selected, and
readjust the position of the at least one of the plurality of icons to be adjacent to the one of the control icons.

19. The apparatus of claim 1, further wherein
the communication server is configured to communicate information regarding the toolbar to a client, via a web server.

20. The apparatus of claim 19, further wherein
the communication server is configured to operate independently of the media types of the plurality of communication channels by virtue of the communication server being configured to communicate with the plurality of communication channel drivers, which each channel driver of the plurality of communication channel drivers is configured to facilitate communications between the communication server and the corresponding one of the plurality of communication channels.

21. The apparatus of claim 20, further wherein
each channel driver of the plurality of communication channel drivers interfaces with the communication server via a single communication application program interface (API),
using the API, the each channel driver of the plurality of communication channel drivers translates incoming events to events recognized by the communication server, and
the communication server is configured to present commands recognized by the each channel driver of the plurality of communication channel drivers, to the each channel driver of the plurality of communication channel drivers.

22. A non-transitory computer-readable storage medium storing a set of instructions executable on a computer system, the set of instructions comprising:
generating a toolbar for display on a client computer, wherein
the toolbar is generated by a communication server,
the toolbar comprises a plurality of icons,
a first icon of the plurality of icons corresponds to a first mode of response to a work item,
the first mode of response corresponds to one of a plurality of media types,
each of the plurality of media types corresponds to a respective communication channel of a plurality of communication channels,
the work item refers to a request to perform an item of work, the communication server is configured to send commands to, and receive events from, the plurality of communication channels via a plurality of communication channel drivers, the toolbar is generated by the communication server such that the toolbar is configured to be displayed on a client computer, and the communication server is configured to
- receive a first incoming event from a first channel driver associated with a first communication channel of the plurality of communication channels,
- send an indication of the first incoming event to the toolbar, wherein the indication is displayed on the toolbar,
- receive a first command associated with the first icon, wherein
  - the first icon is configured to cause the first command to be sent from the client computer, upon selection of the first icon, and
- in response to receiving the first command, send the first command to the first channel driver, wherein the first channel driver executes the first command using the first communication channel.

23. The non-transitory computer-readable storage medium of claim 22, wherein a second icon of the plurality of icons corresponds to a second mode of response to the work item or an other work item, the second mode of response corresponds to a different media type of the plurality of media types than the media type corresponding to the first mode of response, and the communication server is further configured to
- receive a second incoming event from a second channel driver associated with a second communication channel of the plurality of communication channels, wherein
  - the second communication channel is a different media type than the first communication channel,
- send an indication of the second incoming event to the toolbar, wherein
  - the indication is displayed on the toolbar,
- receive a second command associated with the second icon, wherein
  - the second icon is configured to cause the second command to be sent from the client computer, upon selection of the second icon, and
- in response to receiving the second command, send the second command to the second channel driver, wherein
  - the second channel driver executes the second command using the second communication channel.

24. The non-transitory computer-readable storage medium of claim 22, wherein the client computer comprises a web browser program configured to be implemented with a computer system connected to the communication server via a web server, the communication server is configured to receive and route the first incoming event as the work item to a universal queuing system for assignment to a client computer, wherein the universal queuing system is configured to assign, route, and queue work items from the plurality of communication channels to client computers, and the universal queuing system assigns the work item to the client computer and sends the work item back to the communication server for communication to the client computer, the communication server is configured to operate independently of the media types of the plurality of communication channels and specific protocols to communicate with communication devices by virtue of the communication server being configured to communicate with a plurality of channel drivers, wherein each of the plurality of communication channels corresponds to a respective channel driver of a plurality of channel drivers, each respective channel driver interfaces with the communication server via a single communication application program interface, and the single communication application program interface and each respective channel driver is configured to facilitate communications between the communication server and the corresponding one of the plurality of communication channels, the communication server is configured to search for the first command in command tables in configuration data stored in a customer support center database, the communication server collects the configuration data associated with the first command, the communication server is configured to determine which of the plurality of communication channel drivers is to perform the first command, in response to determining that the first channel driver is to perform the first command, the communication server is configured to pass the first command and the configuration data associated with the first command to the first channel driver via the communication application program interface, and the plurality of icons comprises
- a media indicator button that shows the media type of the work item,
- an initiate work item button configured to initiate the work item,
- an accept work item button configured to accept an incoming work item,
- an accept work item control button configured to display a list of incoming work item options, wherein
  - the list of incoming work item options comprise telephone, email, and web collaboration,
- a select work item control configured to display a list of incoming work items,
- an other button configurable to provide other functionality to the toolbar, and
- a select communication channel control button configured to display a list of communication channel options for initiating a work item request, wherein
  - the communication channel options comprise telephone, email, fax, wireless communication, and web collaboration.

* * * * *